United States Patent [19]

Beauregard et al.

[11] 3,742,205
[45] June 26, 1973

[54] RETRACTABLE HEAD LAMP ASSEMBLY

[75] Inventors: Rejean Beauregard; Yvon Cote, both of Valcourt, Quebec, Canada

[73] Assignee: Bombardier Limited, Valcourt, Quebec, Canada

[22] Filed: Sept. 20, 1971

[21] Appl. No.: 181,687

[52] U.S. Cl.................. 240/7.1 H, 240/8.1, 240/57
[51] Int. Cl............................ B60q 1/00, B60q 3/00
[58] Field of Search.................... 240/7.1 H, 8.1, 57

[56] References Cited
UNITED STATES PATENTS

| | | | |
|---|---|---|---|
| 2,312,005 | 2/1943 | Smith | 240/7.1 H |
| 3,284,623 | 11/1966 | Neal | 240/7.1 H |
| 3,532,872 | 10/1970 | Hall | 240/7.1 H |

Primary Examiner—Samuel S. Matthews
Assistant Examiner—Richard A. Wintercorn
Attorney—Larson, Taylor and Hinds

[57] ABSTRACT

The disclosure herein describes a retractable head lamp assembly consisting of a housing which is pivotable in and out of an opening provided in the cab of a snowmobile. It also includes a light projector secured to the housing and a lever assembly operable at the driver station for the pivotal movement of the housing through the opening.

7 Claims, 6 Drawing Figures

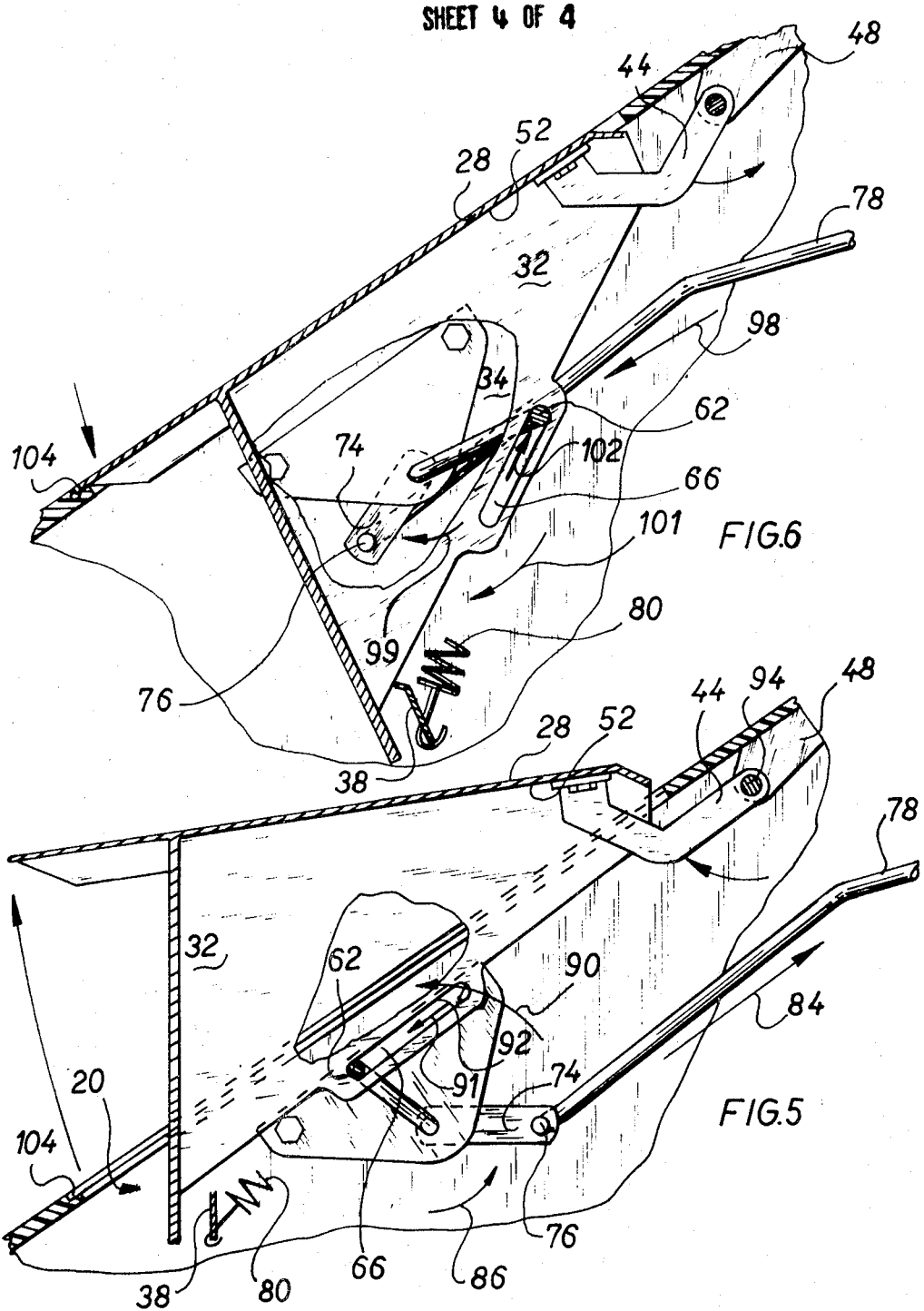

RETRACTABLE HEAD LAMP ASSEMBLY

This invention relates generally to retractable head lamps; more particularly, the invention relates to a head lamp assembly which enables the light projector of a lightweight vehicle to be concealed under the cab of the vehicle when not in use.

In lightweight vehicles, such as snowmobiles, all terrain vehicles or boats, the head lamp is usually mounted in a housing secured or integrally molded to the top surface of the cab located at the front of the vehicle. In other vehicles of similar construction, the head lamp is made retractable in and out of an opening provided in the cab. One known construction being used on snowmobiles consists in a light projector which, while being pivoted "outside" the opening, engages and causes the pivoting of a door or panel which serves to cover the opening when the projector is "inside" the cab or in the retracted position. It has been observed that this type of head lamp construction has several drawbacks: it frequently occurs during the bumpy travel of a snowmobile that the light projector disengages with the panel and pivots back inside the cab; this is due principally to the fact that the light projector and the panel lack any firm connection therebetween. Since the light projector is subject to constant vibratory motion, the direction of the ray of light projected requires frequent readjusting.

It is therefore an object of this invention to provide in lightweight vehicle an improved retractable head lamp assembly which is simple and sturdy in construction, which is easy to move from an open position to a retracted position, and which is firmly held in place during the travel of the vehicle. The head lamp assembly made in accordance with the present invention is achieved by integrally mounting the light projector to the cover thereby forming a single pivoting member which pivots in and out of the opening provided in the cab of the vehicle.

The present invention relates to a retractable head lamp assembly for use in combination with a lightweight vehicle of the type having a cab mounted at the front end thereof and provided with an opening extending through the top face thereof; the retractable head lamp assembly comprises a housing pivotally mounted on the cab for pivotal movement in and out of the opening and having a pair of opposite side walls, other front wall and a top wall to cover the opening; the assembly also includes a light projector mounted in the front wall and lever means mounted on the cab and engaging the side walls. Thus, upon actuation of the lever means, the lever means and the side wall cooperate to pivot the housing in the opening when the light projector is to be lowered in a retracted position or to pivot the housing out of the opening when the light projector is to be raised in an open position.

The above and further objects and advantages of this invention will become apparent from the following detailed specification, appended claims and attached drawings.

Referring to the drawings, which illustrate the invention, and in which like reference numerals indicate like parts throughout the several views:

FIG. 5 is a schematic cross-sectional view illustrating the retractable head lamp assembly in the open position; and FIG. 6 is a schematic cross-sectional view similar to that shown in FIG. 5 but illustrating the head lamp assembly in the retracted position.

Figure 1:
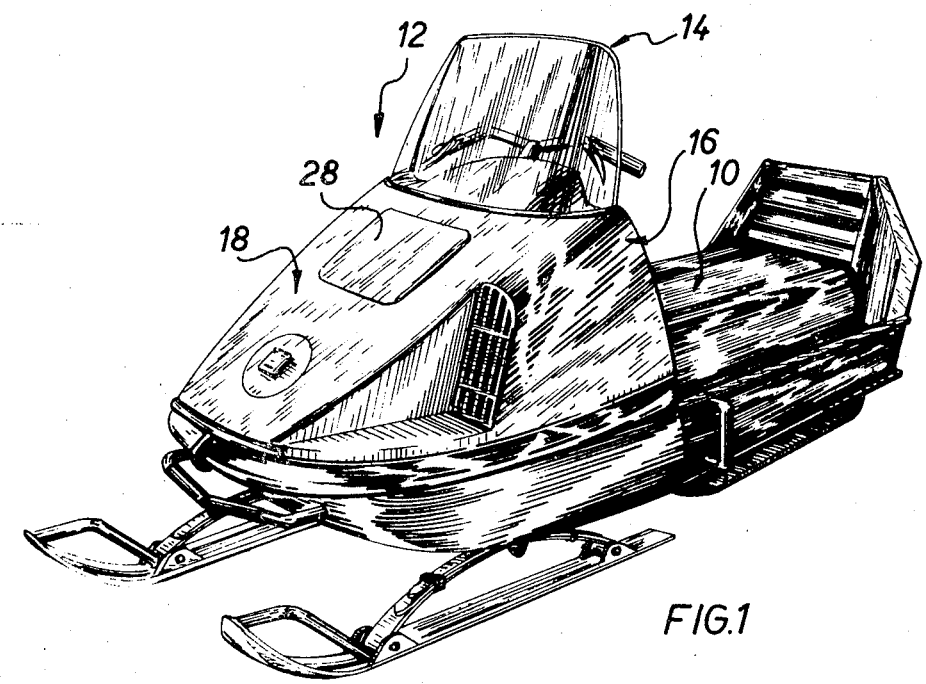
FIG. 1 is a front perspective view of a snowmobile vehicle equipped with a retractable head lamp assembly constructed in accordance with the present invention and shown in the retracted position.

In FIG. 1, a conventional snowmobile is shown as comprising an elongated body having a passenger supporting seat 10 and a hood 12 mounted at its front end. A wind shield 14 projects upwardly from a cab 16 covering the drive motor (not shown) of the vehicle. This type of track-propelled vehicle being well known, a description of the other parts of the vehicle will not be given.

It is wished to have it understood that the present invention is directed to a head lamp assembly for mounting on a cab of a lightweight vehicle; although there is represented a snowmobile in the drawings, it is evident that the invention can also be used on other vehicles having a similar cab construction such as an all-terrain vehicle or even a boat.

Figure 2:
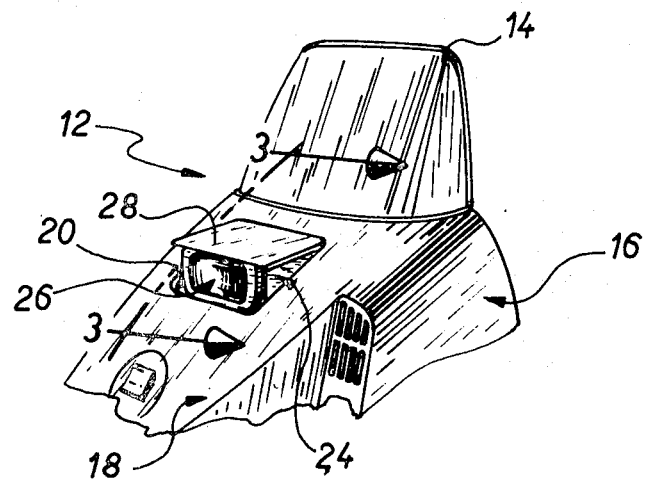
FIG. 2 is a fragmentary front perspective view of the hood portion of the snowmobile shown in FIG. 1 and illustrating the head lamp in the open position.

Referring to FIGS. 1 and 2, the cab 16 is provided on its downwardly inclined top surface 18 with an opening 20 extending therethrough and having a generally rectangular shape. A retractable head lamp assembly is provided in the opening 20 and includes a housing 24 and a light projector 26. The housing 24 includes a top wall 28 having a shape corresponding to the shape of the opening 20 and a surface area substantially equal to that of the opening so that when the head lamp assembly is retracted inside cab 16, the top wall 28 completely covers opening 20, as shown in FIG. 1.

Figure 3:
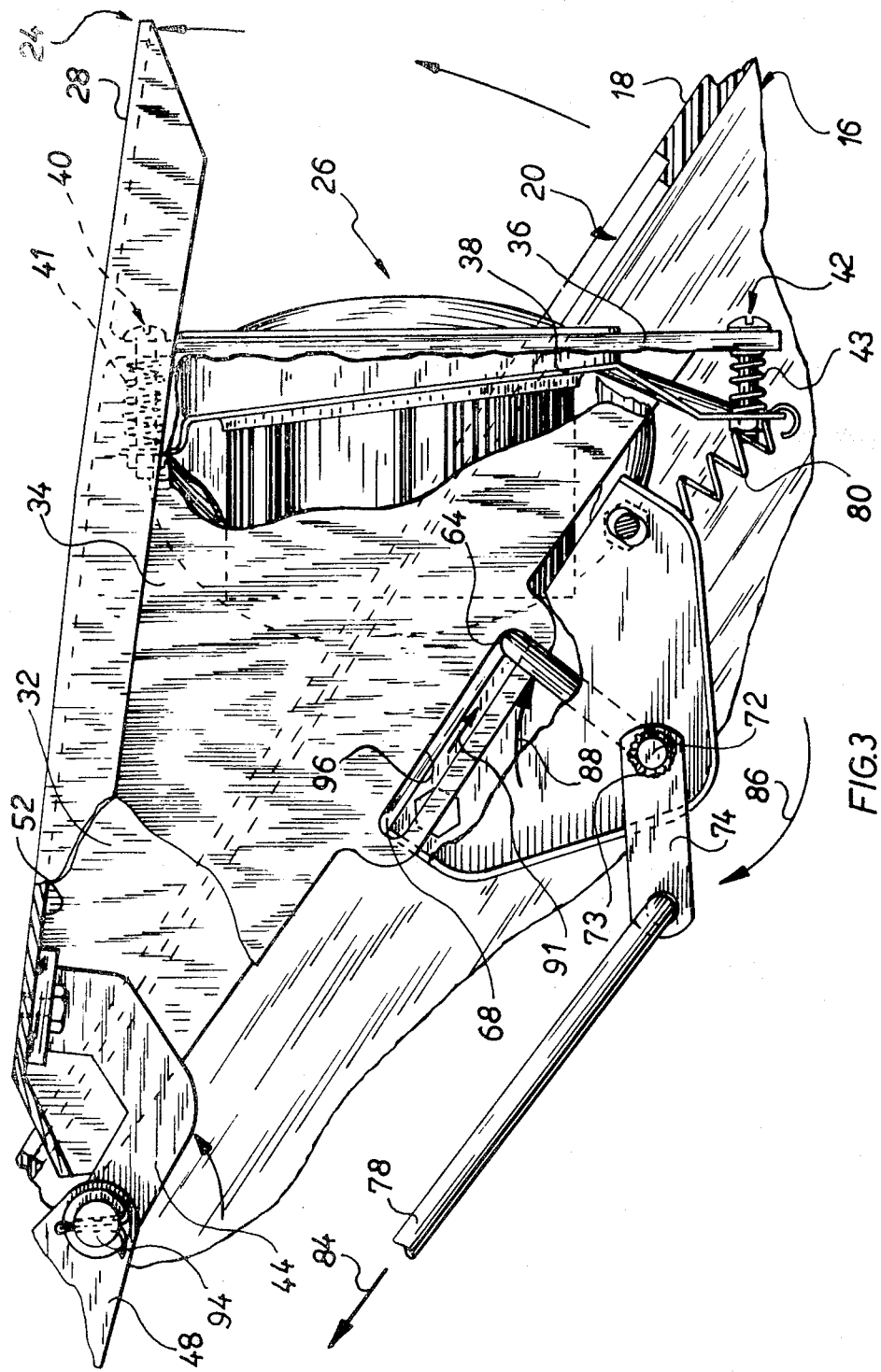
FIG. 3 is a fragmentary cross-sectional view taken along lines 3—3 of FIG. 2.
Figure 4:
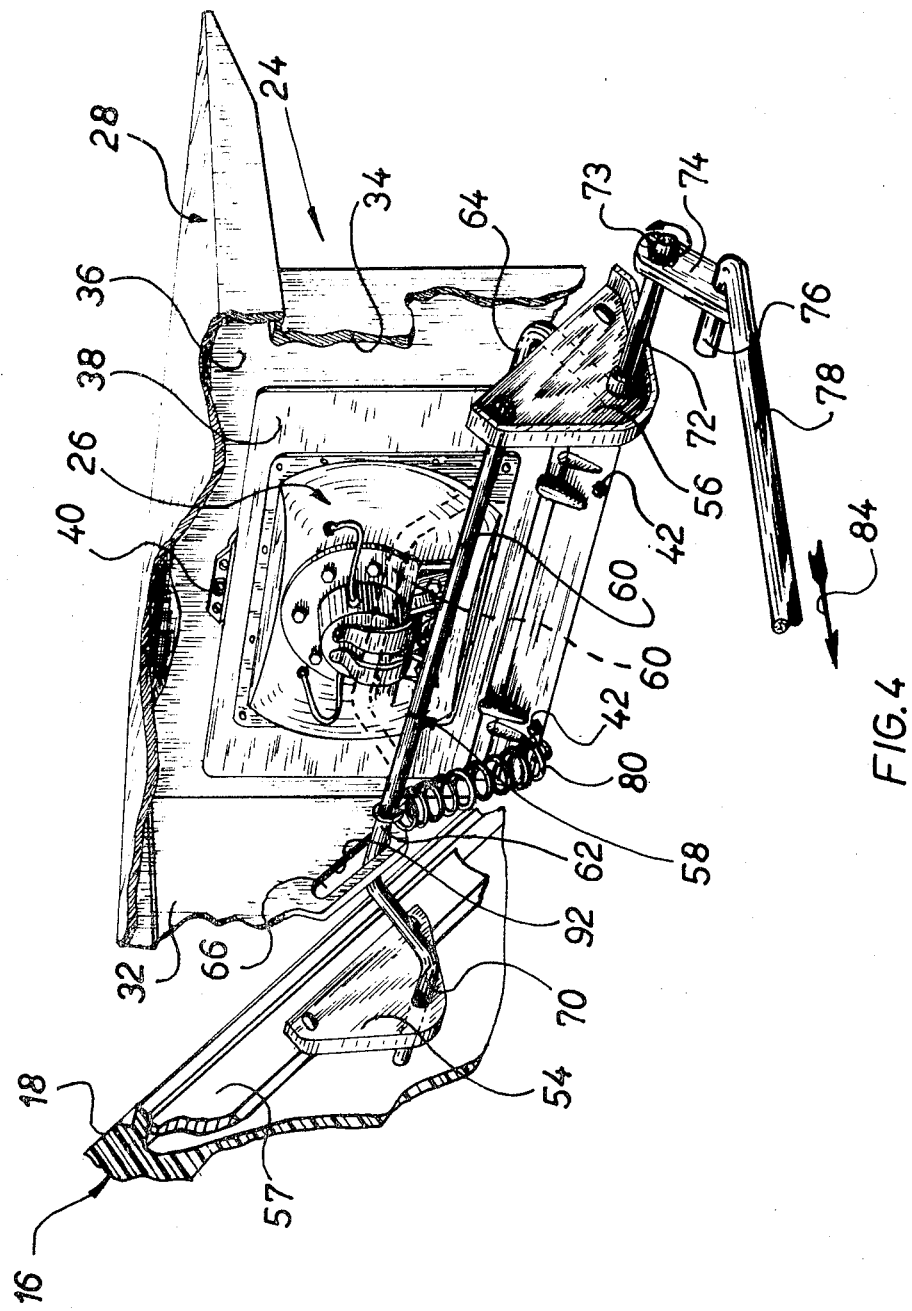
FIG. 4 is a rear perspective view showing in fragments the retractable head lamp assembly of the present invention.

Referring to FIGS. 3 and 4, the housing 24 also includes two vertical opposite side walls 32 and 34 and a front wall 36. Front wall 36 is provided with an opening for receiving a plate or ring 38 to which is suitably secured the light projector 26. Plate 38 is adjustably mounted relative to front wall 36 by means of one upper bolt 40 and of two lower bolts respectively provided above and below the light projector and by springs 41 and 43 which space plate 38 from front wall 36. This enables vertical and lateral adjustment of the light projector 26 for proper projection of the ray of light emitted.

The housing 24 is pivotally mounted to the cab 16 by means of a pair of laterally spaced hinge members 44, each having one end pivotally connected to a bracket 48 welded or otherwise secured to the cab 16. The other end of each member 44 is fixedly secured to the undersurface 52 of the top wall 30 of the housing.

The housing 24 with the light projector 26 is pivoted in and out of the opening 20 by means of a lever arrangement which includes a lever 58 that extends transversely across the rear portion of the light projector 26 and through side walls 32 and 34. This lever is supported for pivotal movement in a pair of triangular-shaped members 54 and 56 which are bolted or otherwise secured to flanges (one of which is shown at 57 in FIG. 4) extending under the top surface 18 of the cab adjacent the opening 20.

Lever 58 includes a straight middle portion 60 and two intermediate portions 62 and 64 respectively protruding through elongate slots 66 and 68 of side walls 32 and 34 and curving down to two end portions 70 and 72 extending through members 54 and 56 respectively. For clarity purposes, central portion 60 is shown being straight; however, in order to bypass the rear accessories of head lamp 26, this portion may need to be bent as indicated by dotted lines 60 in FIG. 4. Side walls 32 and 34 respectively take support on lever portions 62 and 64. The opposite end portions 70 and 72 of lever 58 are adapted to rotate in members 54 and 56 secured to the cab.

The end portion 72 is fixed, such as by a weld 73, to one end of a link member 74; the other end of member 74 rotatably receives the bent portion 76 of a control rod 78 which has its other end (not shown) extending through the cab adjacent the driver station of the snowmobile for manual actuation by the driver. As it can be seen in FIG. 4, the actuation of rod 78 in the direction of arrow 84 will cause a rotation of link member 74 in the clockwise direction; lever 58 will rotate in a similar direction because of its rigid connection 73 with the link member 74.

With reference to FIGS. 3, 4 and 5, the operation of pivoting the housing into the open position will now be described. By manually exerting a pull on rod 78 in the direction of arrow 84, link member 74 is rotated in the direction of arrow 86 causing also a similar rotation of traverse lever 58. In FIG. 3, arrow 88 indicates the rotational direction of the intermediate portion 64 of lever 58 while, in FIG. 5, arrow 90 indicates the same rotational direction of intermediate portion 62. The pivotal movement of lever 58 results in having intermediate portions 62 and 64 longitudinally displaced in the direction of arrow 91 in slots 66 and 68, respectively, and frictionally engaging the upper edges 92 and 96 of side walls 32 and 34. This causes the pivoting of the housing 24 about pivot point 94 and the raising of the light projector 26 outside the cab 16. The raising operation of the housing terminates when lever portions 62 and 64 reach the extremities of their respective slots 66 and 68. There, a pre-stressed coil spring 80, having one end hooked on one lever portion (see FIG. 4) and the other end fixed to the lower edge of plate 38, maintains the lever portions 62 and 64 against the extremities of the slots 66 and 68. It is to be noted that spring 80 also assists in the pivotal movement of lever 58; when lever portions 62 and 64 are at about the center of their respective slots, the longitudinal axis of spring 80 coincides with the plane of lever 58 and the resulting force by the spring on the lever is zero; however, any deviation from this neutral point results in spring 80, which is always under stress, to combine with the weight action of the housing in effecting the pivotal movement (clockwise or counter-clockwise) of lever 58 and also, in maintaining the lever portions 62 and 64 against their respective slot extremities. Hence, during the travel of the vehicle on a bumpy terrain, there is a constant force exerted by spring 80 and the weight of the housing to oppose any forces that would cause lever 58 to fall back in the other position.

To conceal the light projector underneath the cab, i.e., to move the housing 24 from the open position shown in FIG. 5 to the closed position shown in FIG. 6, an inward thrust is exerted on rod 78 in the direction of arrow 98, as shown in FIG. 6, causing the link member 74 to rotate in a clockwise direction as shown by arrow 99. The pivotal movement of link member 74 causes a similar rotation of the side wall engaging portions 62 and 64. Housing 24 is pulled in a downward direction as it pivots about point 94. The intermediate portions 62 and 64 are longitudinally displaced in slots 66 and 68 in the direction of arrow 102 in FIG. 6. The downward movement of housing 24 is terminated when the edges of the top wall 28 touch the adjacent edges 104 of the cab 16. Again, coil 80 and the weight of the housing combine to bias lever 58 against reverse rotation during bumpy travel of the vehicle over an uneven terrain. In the closed position, the top wall of the housing blends with the exterior shape of the cab to provide a uniform line to the front of the vehicle.

Although the invention has been described above in relation to one specific form of the invention, persons skilled in the art will be aware that it may be refined and modified in various ways. It is therefore wished to have it understood that this invention is not limited in interpretation except by the scope of the following claims.

The embodiments of the invention in which an exclusive property or privilege is claimed are defined as follows:

1. A retractable head lamp assembly for use in combination with a lightweight vehicle having a cab at the front thereof, said cab having an opening on the top face thereof, comprising: a housing mounted in said cab and pivotable about a first axis to be moved in and out of said opening; said housing including a pair of opposite side walls, a front wall and a top wall having an area substantially equal to that of said opening to cover said opening when said housing is pivoted in a retracted position in said opening; said side walls, said front wall and said top wall being connected together for movement as a unit as the housing pivots about said first axis, each of said side walls having an elongate slot; a light projector mounted in said front wall; a transverse rod means supported on said cab and pivotable about a second axis, said rod means extending through and movable along the lengths of said elongate slots of said side walls; and rod actuating means for causing the pivotal movement of said transverse rod means about said second axis such that upon actuation of said acutating means, said transverse rod means moves in said elongate slots causing the pivotal movement of said housing about said first axis, resulting, in one direction in said slots, in retracting said housing in said cab and, in the opposite direction, in raising said housing out of said cab.

2. A retractable head lamp assembly according to claim 1, said side walls being generally parallel to each othe and generally perpendicular to said front wall, and said top wall lying across the top of the front wall and said side walls.

3. A retractable head lamp assembly according to claim 2, said slots in the side walls being aligned with each other in a direction transverse to the planes of the parallel side walls, said rods having aligned ends and a U-shaped central portion, the ends of said rods being pivotably mounted in the cab, and the bottom of the U-shaped central portion extending through and between said slots.

4. A retractable head lamp assembly according to claim 2, the dimensions of said top mating with the said openings so that the top is flush with the top face of the cab when the housing is pivoted into the cab.

5. A retractable head lamp assembly as defined in claim 1, further including spring means having one end secured to said transverse rod means and the other end secured to said front wall for assisting the pivotal movement of said transverse rod means and for maintaining said transverse rod means in their respective positions when said light projector is in the retracted position and in the open position.

6. A retractable head lamp assembly as defined in claim 5, including means for adjusting the relative position of said light projector to said front wall.

7. A retractable head lamp assembly as defined in claim 1, wherein said rod actuating means include a control rod, having one end mounted adjacent the driver station of the vehicle, and a link member pivotally receiving the other end of said control rod at one end thereof and being rigidly fixed to one extremity of said transverse rod means at the other end thereof.

* * * * *